(12) United States Patent
Nara et al.

(10) Patent No.: US 7,146,079 B2
(45) Date of Patent: Dec. 5, 2006

(54) DYNAMIC GAIN EQUALIZER

(75) Inventors: Kazutaka Nara, Tokyo (JP); Kazuhisa Kashihara, Tokyo (JP); Noritaka Matsubara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/113,223

(22) Filed: Apr. 25, 2005

(65) Prior Publication Data

US 2006/0039704 A1 Feb. 23, 2006

Related U.S. Application Data

(63) Continuation of application No. PCT/JP03/013616, filed on Oct. 24, 2003.

(30) Foreign Application Priority Data

Oct. 25, 2002 (JP) ............................. 2002-311348

(51) Int. Cl.
*G02B 6/26* (2006.01)

(52) U.S. Cl. ............................. 385/39; 385/3; 385/24; 385/27; 359/337.1; 398/161

(58) Field of Classification Search .................... 385/3, 385/15, 24, 27, 39; 359/337.1; 398/161
See application file for complete search history.

(56) References Cited

U.S. PATENT DOCUMENTS

| 5,351,317 A | * | 9/1994 | Weber ............................. 385/3 |
| 6,344,914 B1 | * | 2/2002 | Shimojoh et al. ............. 398/17 |
| 6,411,417 B1 | * | 6/2002 | Roberts et al. ............. 398/177 |
| 2002/0054726 A1 | | 5/2002 | Fondeur et al. ............... 385/15 |

FOREIGN PATENT DOCUMENTS

EP         1 286 192 A2    2/2003

OTHER PUBLICATIONS

Inoue et al, "Tunable Gain Equalization Using A Mach-Zehnder Optical Filter In Multistage Fiber Amplifiers", IEEE Photonics Technology Letters, vol. 3, No. 8, Aug. 1991, pp. 718-720.*
Takashi Saida, et al., Dynamic gain equalization filter based on PLC-type optical transversal filter, The Institute of Electronics, Technical Report of IEICE, vol. 102, No. 288, Aug. 23, 2002; pp. 19-23.
T. Mizuno, et al., "Dispersionless Interleave Filter Based on Transversal Structure", The Institute of Electronics, Information an Electronics Society, Aug. 20, 2002, p. 184.

* cited by examiner

*Primary Examiner*—John D. Lee
(74) *Attorney, Agent, or Firm*—Oblon, Spivak, McClelland, Maier & Neustadt, P.C.

(57) ABSTRACT

The dynamic gain equalizer for flattening a gain profile of an optical amplifier includes: an optical waveguide circuit having multistage optical couplers, demultiplexing and multiplexing, each formed by connecting optical couplers arranged at a plurality of stages; and optical connecting circuits including optical phase shifters each capable of changing a phase of propagating light and optical delay lines each for adding a predetermined delay time to the propagating light, said dynamic gain equalizer in which at least one of the optical couplers in the two multistage optical couplers are provided with variable optical amplitude means, respectively, and each of the multistage optical couplers are formed asymmetrically with respect to an extension of a line which connects a center arranged position of optical outputting ends of the demultiplexing multistage optical coupler with a center arranged position of optical inputting ends of the multiplexing multistage optical coupler.

18 Claims, 11 Drawing Sheets

DYNAMIC GAIN EQUALIZER

TECHNICAL FIELD

The present invention relates to a dynamic gain equalizer which is used in the optical communication filed such as wavelength division multiplexing (WDM) transmission.

BACKGROUND OF THE INVENTION

In a DWDM (Dense Wavelength Division Multiplexing) system, one of key technologies is an optical amplifier using an EDFA ($Er^{3+}$ Doped Fiber Amplifier). The EDFA has a gain profile as shown in FIG. 5, for example. In other words, the profile of EDFA is not flat since high gain is shown at the wavelengths ranging from 1530 to 1560 nm.

The profile lines a through e on FIG. 5 are shown in ascending order of the pump light level input to the EDFA. In other words, among these profile lines a through e, the profile line a shows a gain profile obtained when the pump light level is the smallest while the profile line e shows a gain profile obtained when the pump light level is the largest.

Then, in order that the EDFA is applied to the DWDM system, flattening of the EDFA gain profile has been pursued. This gain flattening is carried out by applying an optical gain flattening filter which has a loss profile reverse to the EDFA gain profile.

In addition, there has been proposed lattice filter type gain flattening by the use of a multistage Mach-Zehnder interferometer (MZI) (see Zinguji et al, "design of lattice type gain equalizer based on Lawson Rule" (2001 IEICE General Conference C-3-50).

Further, as another example of gain flattening with use of PLC, there has been proposed optical transversal filter type gain flattening (see for example, A. Ranalli and B. Fondeur, "PLANARTAPPED DELAT LINE BASED, ACTIVELY CONFIGURABLE GAIN-FLATTENING FILTER" Proc. ECOC, Paper 7-1-2, 2000)

SUMMARY OF THE INVENTION

A dynamic gain equalizer according to a first aspect of the present invention is a dynamic gain equalizer comprising an optical waveguide circuit having a multistage optical coupler which is formed by connecting optical couplers arranged at a plurality of stages, a multistage optical coupler formed by connecting optical couplers arranged at a plurality of stages, and optical connecting circuits including optical phase shifters each capable of changing a phase of propagating light and optical delay lines each for adding a predetermined delay time to the propagating light, wherein each of at least one of the optical couplers in the multistage optical coupler and at least one of the optical couplers in the multistage optical coupler is provided with variable optical amplitude means, and the multistage optical coupler and the multistage optical coupler are formed asymmetrically with respect to an extension of a line which connects a center arranged position of optical outputting ends of the multistage optical coupler with a center arranged position of optical inputting ends of the multistage optical coupler.

BRIEF DESCRIPTION OF THE INVENTION

DETAILED DESCRIPTION OF THE INVENTION

There are various types of gain equalizers, including, for example, a gain equalizer using an optical gain flattening filter, a gain equalizer using an acoustooptic filter, a gain equalizer using a MEMS (Micro Electro Mechanical System) and a gain equalizer using PLC (Planar Lightwave Circuit). First consideration is made about these dynamic gain equalizers.

First, an optical gain flattening filter realizes a loss profile reverse to the EDFA gain profile by the following manner. That is, one proposed way of realizing by the optical gain flattening filter is such that a plurality of etalon filters of different refractive indexes and periods (FSR) are combined to realize a desired spectrum.

Further, as other proposed examples of the optical gain flattening filter, there are a way of realizing a desired spectrum by a dielectric multilayer filter and a way of utilizing a long-period fiber grating (FBG).

Here, such an optical gain flattening filter as mentioned above is generally customized so as to flatten gain of one EDFA gain profile.

However, since the EDFA gain profile varies depending on a pump light level, there is a problem such that a filter desired to flatten gain of one gain profile as mentioned above dynamically reacts to change of a pump light level.

Then, in the future, it is essential to realize a dynamic gain equalizer which is capable of changing a loss profile corresponding to change in the EDFA gain profile.

It is considered that among the above-described gain equalizers, a gain equalizer which utilizes a PLC will become a promising device as compared with the other devices due to its high controllability and stability. For this reason, the inventors have decided to consider a PLC type dynamic gain equalizer. Then, the inventors have studied as the PLS type dynamic gain equalizer a lattice filter type gain equalizer by the use of a multistage Mach-Zehnder interferometer (MZI).

Further, as another example of a dynamic gain equalizer by the use of PLC the inventors have considered an optical transversal filter type dynamic gain equalizer using a variable optical coupler, an optical delay line and a phase shifter.

Dynamic gain equalizers using these PLCs have a problem of relatively large insertion loss. When a dynamic gain equalizer is used as a gain flattening filter of an optical amplifier, small insertion loss is desired due to a problem of S/N ratio and therefore, it is important to reduce the insertion loss.

Figure 1:
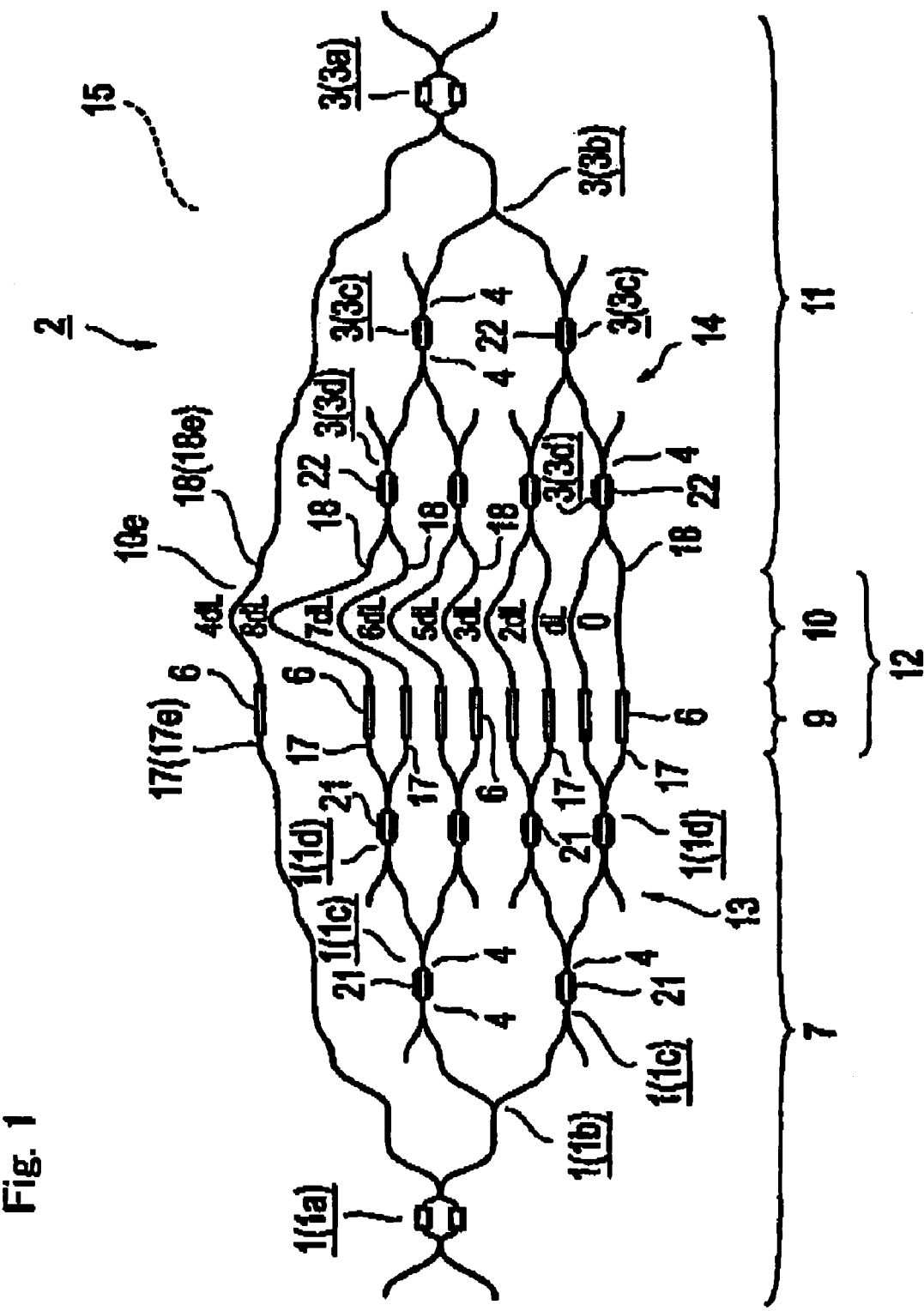
FIG. 1 is a view illustrating a configuration of substantial parts of a dynamic gain equalizer according to one embodiment of the present invention.

FIG. 1 shows a dynamic gain equalizer according to an embodiment of the present invention which is capable of reducing insertion loss and flattening gain of an optical amplifier irrespective of pump light level. Hereinafter, the embodiments of the present invention will be described with reference to the drawings.

A dynamic gain equalizer according to an embodiment of the present invention is illustrated in FIG. 1. As shown in FIG. 1, the dynamic gain equalizer according to this embodiment includes a planar lightwave circuit which is an optical waveguide circuit 2 with circuitry configuration shown in FIG. 1 formed on a substrate 15. The optical waveguide circuit 2 includes a multistage optical coupler 7 and a multistage optical coupler 11.

The multistage optical coupler 7 is formed by connecting optical couplers 1 at plural stages and has a plurality of optical outputting ends 17. The multistage optical coupler 11 is formed by connecting optical couplers 3 at plural stages and has a plurality of optical inputting ends 18.

Also in the present embodiment, at least one of the plural optical couplers 1 and the plural optical couplers 3 has a Y-shaped demultiplexing circuit and at least one of the plural optical couplers 1 and the plural optical couplers 3 has a Mach-Zehnder interferometer.

For example, the first stage optical coupler 1(1*a*), the third and fourth stage optical couplers 1(1*c*, 1*d*) have Mach-Zehnder interferometers and the second optical coupler 1(1*b*) has a Y-shaped demultiplexing circuit. In addition, the final stage optical coupler 3(3*a*), the third and fourth optical couplers 3 (3*c*, 3*d*) from the final stage have Mach-Zehnder interferometers and the optical coupler c immediately in front of the final stage optical coupler has a Y-shaped demultiplexing circuit.

Provided between each of the optical outputting ends 17 of the multistage optical coupler 7 and a corresponding one of the optical inputting ends 18 of the multistage optical coupler 11 is a optical connecting circuit 12. The optical connecting circuit 12 is configured by an optical phase shifter 9 capable of changing a phase of propagating light and an optical delay line 10 for adding a predetermined delay time to the propagating light. Each optical phase shifter 9 has one light waveguide and is configured by forming a TiNi heater phase regulating means 6 on the optical waveguide.

Figure 2A:
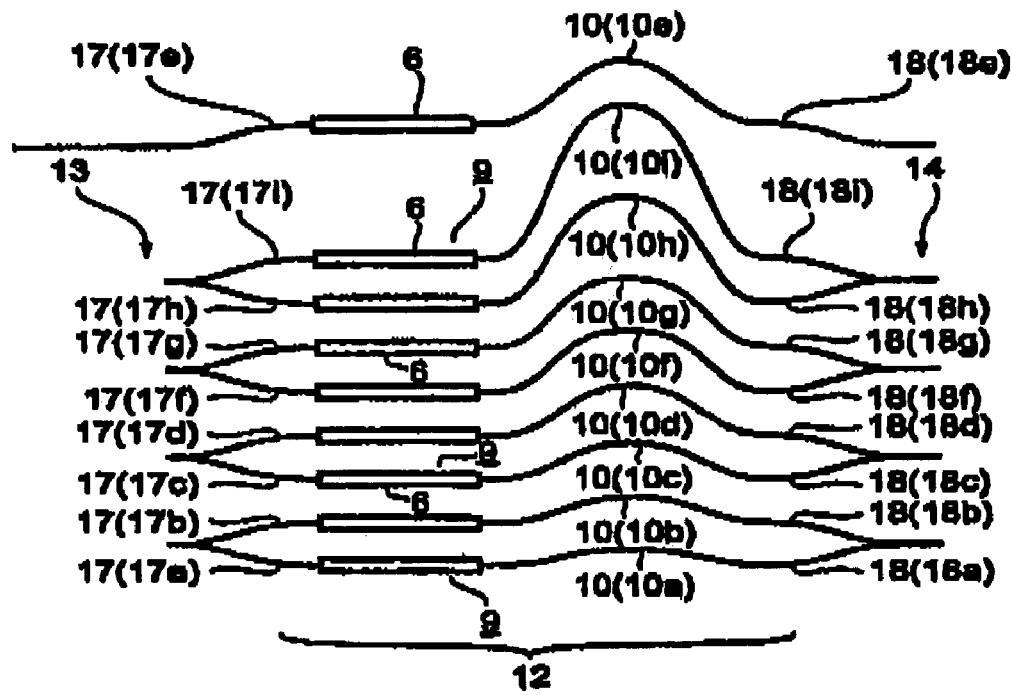
FIG. 2A is a view for explaining a configuration of optical delay lines and their adjacent parts of a dynamic gain equalizer according to the above-mentioned embodiment.
Figure 2B:
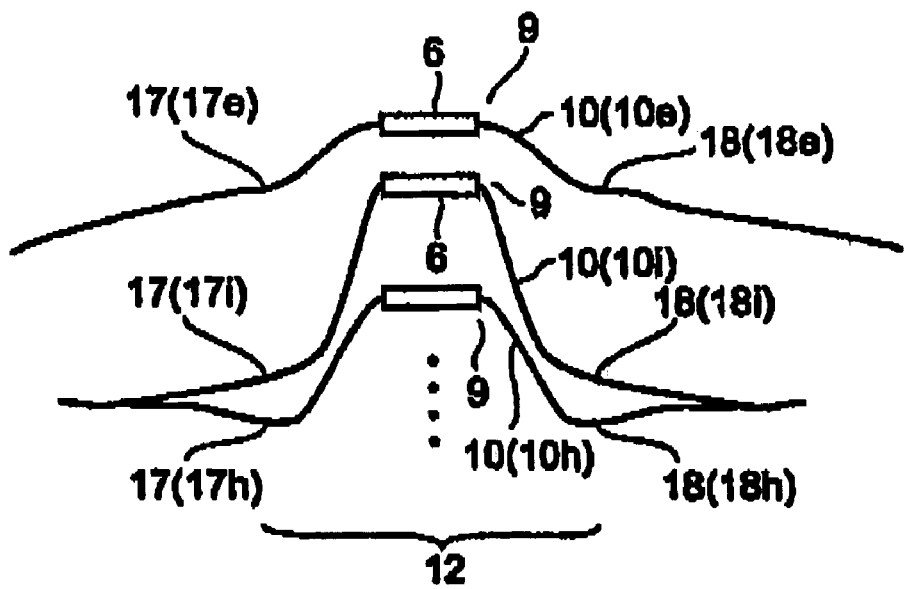
FIG. 2B is a view for explaining another configuration of an optical connecting circuit shown on FIG. 2A.

In this embodiment, the optical connecting circuit 12 is formed as shown in FIGS. 1 and 2A, by connecting in series an optical phase shifters 9 and an optical delay lines 10. However, as shown in FIG. 2B, the optical connecting circuit 12 can be formed by providing an optical delay line 10 with phase shifting means 6 to have a function of an optical phase shifter 9.

Further, at least one optical coupler 1 of the multistage optical coupler 7 is provided with variable optical amplitude means 21 while at least one optical coupler 3 of the multistage optical coupler 11 is provided with variable optical amplitude means 22.

In this embodiment, the optical couplers 1 (1*a*, 1*c*, 1*d*) and the optical couplers 3 (3*a*, 3*c*, 3*d*) formed by Mach-Zehnder interferometers are provided with variable optical amplitude means 21 and 22. The variable optical amplitude means 21 and 22 are formed by TiNi heaters.

The multistage optical coupler 7 and the multistage optical coupler 11 are configured asymmetrically with respect to an extension of a line which connects the center arranged position of the optical outputting ends 17 of the multistage optical coupler 7 ad the center arranged position of the optical inputting ends 18 of the multistage optical coupler 11.

Further, the number of the optical outputting ends 17 of the multistage optical coupler 7 and the number of the optical inputting ends 18 of the multistage optical coupler 11 are the same odd number, and optical delay lines 10 provided between the optical outputting ends 17 and the corresponding optical inputting ends 18 are different in length from each other.

In FIG. 1, the optical delay line 10*a* provided at the bottom is used as a basis, the second optical delay line 10*b* from the bottom is longer by dL than the optical delay line 10*a*, the third optical delay line 10*c* from the bottom is longer by 2 dL than the optical delay line 10*a*, and the fourth optical delay line 10*d* from the bottom is longer by 3 dL than the optical delay line 10*a*.

Among the optical delay lines 10 which are provided different in length, the substantially center optical delay line 10*e* of middle length is provided at the top and longer by 4 dL than the above-mentioned optical delay line 10*a*, and the fifth optical delay lines 10*f* through 10*i* are formed longer by dL than the respective immediately beneath optical delay lines, and the optical delay line 10*i* is formed longer by 8 dL than the optical delay line 10*a*. Here, dL=39.9 μm.

In addition, connected to the inputting side of the above-mentioned substantially center optical delay line 10*e* is one optical outputting portion (that is, optical outputting end 17*e*) of the first stage optical coupler 1 (1*a*) of the aforementioned multistage optical coupler 7. The other optical outputting portion of the first stage optical coupler 1*a* is connected to an optical inputting portion of the second stage optical coupler 1 (1*b*), and the second stage optical coupler 1 and optical couplers 1 following the second stage optical coupler 1 consist in an optical demultiplexing portion 13.

As shown in FIG. 2A, optical outputting ends of the optical demultiplexing portion 13 forms optical outputting ends 17 (17*a* to 17*d*, 17*f* to 17*i*) of the multistage optical coupler 7 which are connected to corresponding optical delay lines 10 (10*a* to 10*d*, 10*f* to 10*i*) other than the above-mentioned substantially center optical delay line 10*e*.

As shown in FIG. 1, connected to the outputting side of the above-mentioned substantially center optical delay line 10*e* is one optical inputting portion (that is, optical inputting end 18*e*) of the final stage optical coupler 3 (3*a*) of the aforementioned multistage optical coupler 11. The other optical inputting portion of the final stage optical coupler 3*a* is connected to the optical coupler 3 (3*b*) immediately in front of the final stage optical coupler 3 (3*a*), and optical couplers 3 in front of the final stage optical coupler 3a consist in an optical multiplexing portion 14.

As shown in FIG. 2A, optical inputting ends of the optical multiplexing portion 13 forms optical inputting end 18s (18a to 18d, 18f to 18i) of the multistage optical coupler 7 which are connected to optical outputting side of the corresponding optical delay lines 10 (10a to 10d, 10f to 10i) other than the above-mentioned substantially center optical delay line 10e.

The above-mentioned optical demultiplexing portion 13 and optical multiplexing portion 14 are formed symmetric with respect to an extension of a line which connects the center arranged position of the optical outputting ends of the optical demultiplexing portion 13 and the center arranged position of the optical inputting ends of the optical multiplexing portion 14.

The present embodiment is configured as described above. When determining the configuration of the present embodiment, the inventors have studied to formulate any waveform filter combining based on the conventional optical transversal filter configuration. Here, in FIG. 6, like components of same name in the optical waveguide circuit 2 which forms a dynamic gain equalizer according to the present embodiment are indicated by the same symbols.

Figure 6:
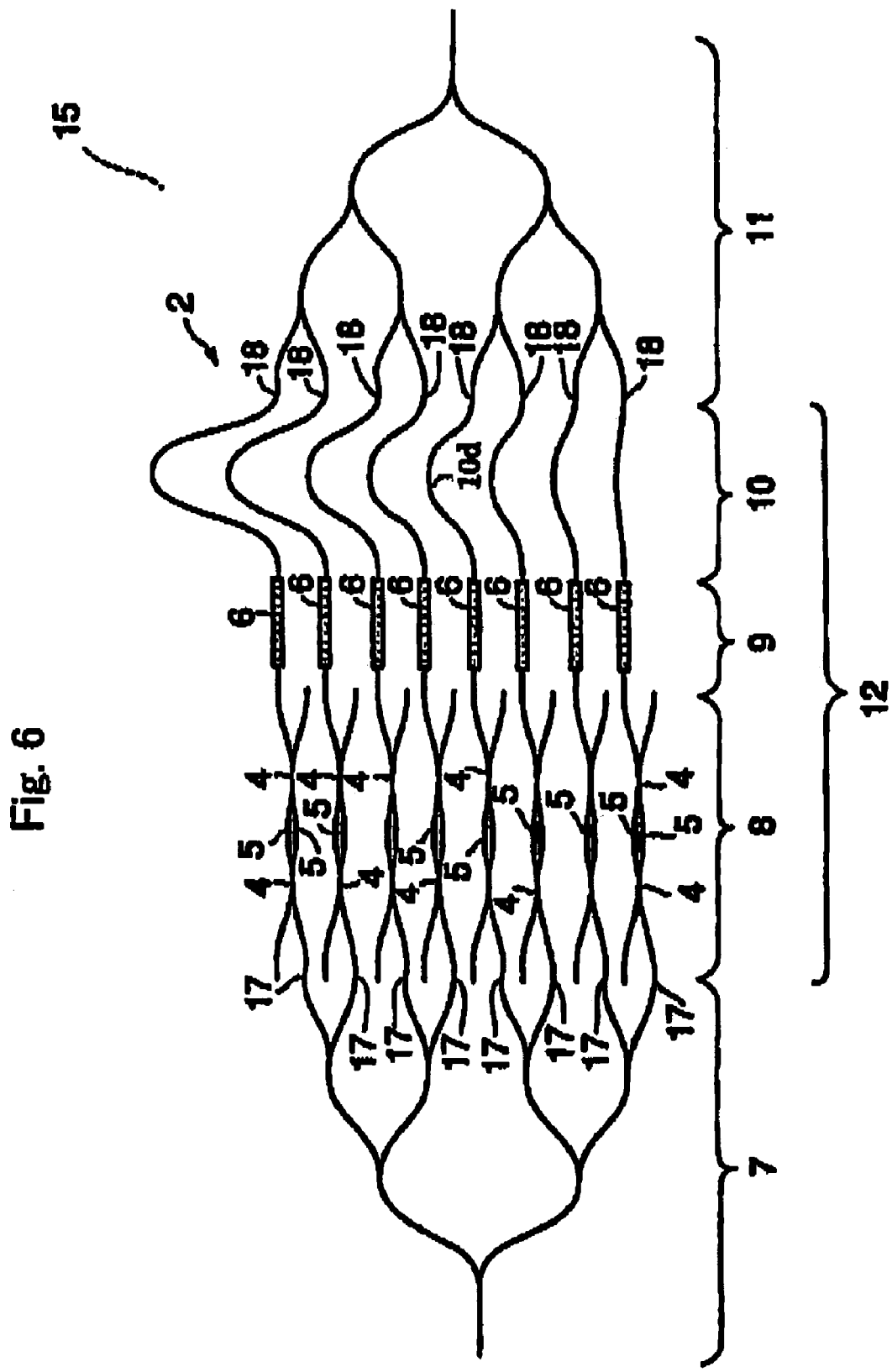
FIG. 6 is an explanatory view illustrating a configuration of an optical transversal filter.

As shown in FIG. 6, the conventional transversal filter has a multistage optical coupler (splitter) 7 with a plurality of optical outputting ends 17 and a multistage optical coupler (combiner) 11 with a plurality of optical inputting ends 18.

Further, between the optical outputting ends 17 of the aforementioned optical coupler 7 and the corresponding optical inputting ends 18 of the aforementioned optical coupler 11, optical connecting circuits 12 including variable optical attenuators (VOA) 8, optical phase shifters 9 and optical delay lines 9 are provided. This optical transversal filter is allowed to change an optical frequency characteristic of the optical digital filter 1 arbitrarily by setting to be able to change optical amplitudes of the aforementioned variable optical attenuators 8 and phase regulated amounts of the optical phase shifters 9.

Each of the aforementioned variable optical attenuators 8 has a Mach-Zehnder interferometer formed by arranging two optical waveguides (cores) and is configured by forming a heater 5 on the waveguides sandwiched by two directional couplers 4. Each of the aforementioned optical phase shifters 9 is formed in the same way as the present embodiment and the optical delay lines 10 are formed to have optical waveguides of different length.

Then, in the optical transversal filter shown in FIG. 6, assuming that the number of taps (the number of blanches of the multistage optical coupler 7) is N, the transfer function from the multistage optical coupler 7 to the phase shifters 9 is expressed by Equation 1, in which n denotes tap number.

$$\sum_{n=0}^{N-1} \frac{1}{\sqrt{N}} a_n e^{j\theta_n} \qquad \text{Equation 1}$$

Here, $g_n = a_n \cdot e^{j\theta_n}$. $a_n$ is an optical amplitude of a variable optical attenuator 8 and $\theta n$ is a phase regulated amount (phase shift amount) of a phase shifter. These are tap coefficients of the optical transversal filter. j is $\sqrt{(-1)}$.

When the transfer function from the optical delay lines 10 to the multistage optical coupler 11 is adjusted to the transfer function of Equation 1, the transfer function G of the transversal filter can be give by Equation 2.

$$G = \sum_{n=0}^{N-1} \frac{1}{\sqrt{N}} g_n \times e^{-j\beta n \Delta L} \times \frac{1}{\sqrt{N}} \qquad \text{Equation 2}$$

$$= \frac{1}{N} \sum_{n=0}^{N-1} g_n e^{-j\beta n \Delta L}$$

$$= \frac{1}{N} \sum_{n=0}^{N-1} g_n e^{-j\frac{2\pi}{c} n_{eff} f n \Delta L}$$

in which β is a propagation constant, ΔL is a difference of length between optical delay lines, $n_{eff}$ is an equal refractive index of a waveguide, c is a light velocity, f is an optical frequency, and l is an integer.

Here, when Equations 3 to 4 are given as follows (in which m is an integer), Equation 6 can be derived.

$$f \equiv f_l = f_c + l\Delta f = f_c + l\frac{FSR}{N} \qquad \text{Equation 3}$$

$$FSR = \frac{c}{n_{eff}\Delta L} \qquad \text{Equation 4}$$

$$f_c = mFSR \qquad \text{Equation 5}$$

$$G_l(f_l) \equiv G_l(l\Delta f) = \frac{1}{N} \sum_{n=0}^{N-1} g_n e^{-j\frac{2\pi}{N} nl} \qquad \text{Equation 6}$$

Then, when the sampling coefficient from a desired optical frequency characteristic G1 is N', $g_n$ can be obtained based on discrete Fourier transform of Equation 7 from Equation 6.

$$g_n = \sum_{l=0}^{N'-1} G_l e^{j\frac{2\pi}{N'} nl} \qquad \text{Equation 7}$$

In which the tap number n is $-(N-1)/2 \leq n \leq (N-1)/2$ (N is an odd number), $-N/2 \leq n \leq N/2-1$ (N is an even number), Accordingly, the tap coefficients (optical amplitude $a_n$ of a variable optical attenuator 8 and a phase regulated amount $\theta n$ of an optical phase shifter 9) are give by the Equations 8 and 9.

$$a_n = \sqrt{\left\{\sum_{l=0}^{N'-1} G_l \cos\left(\frac{2\pi}{N'} nl\right)\right\}^2 + \left\{\sum_{l=0}^{N'-1} G_l \sin\left(\frac{2\pi}{N'} nl\right)\right\}^2} \qquad \text{Equation 8}$$

$$\theta_n = \tan^{-1} \frac{\sum_{l=0}^{N'-1} G_l \sin\left(\frac{2\pi}{N'} nl\right)}{\sum_{l=0}^{N'-1} G_l \cos\left(\frac{2\pi}{N'} nl\right)} \qquad \text{Equation 9}$$

Figure 5:
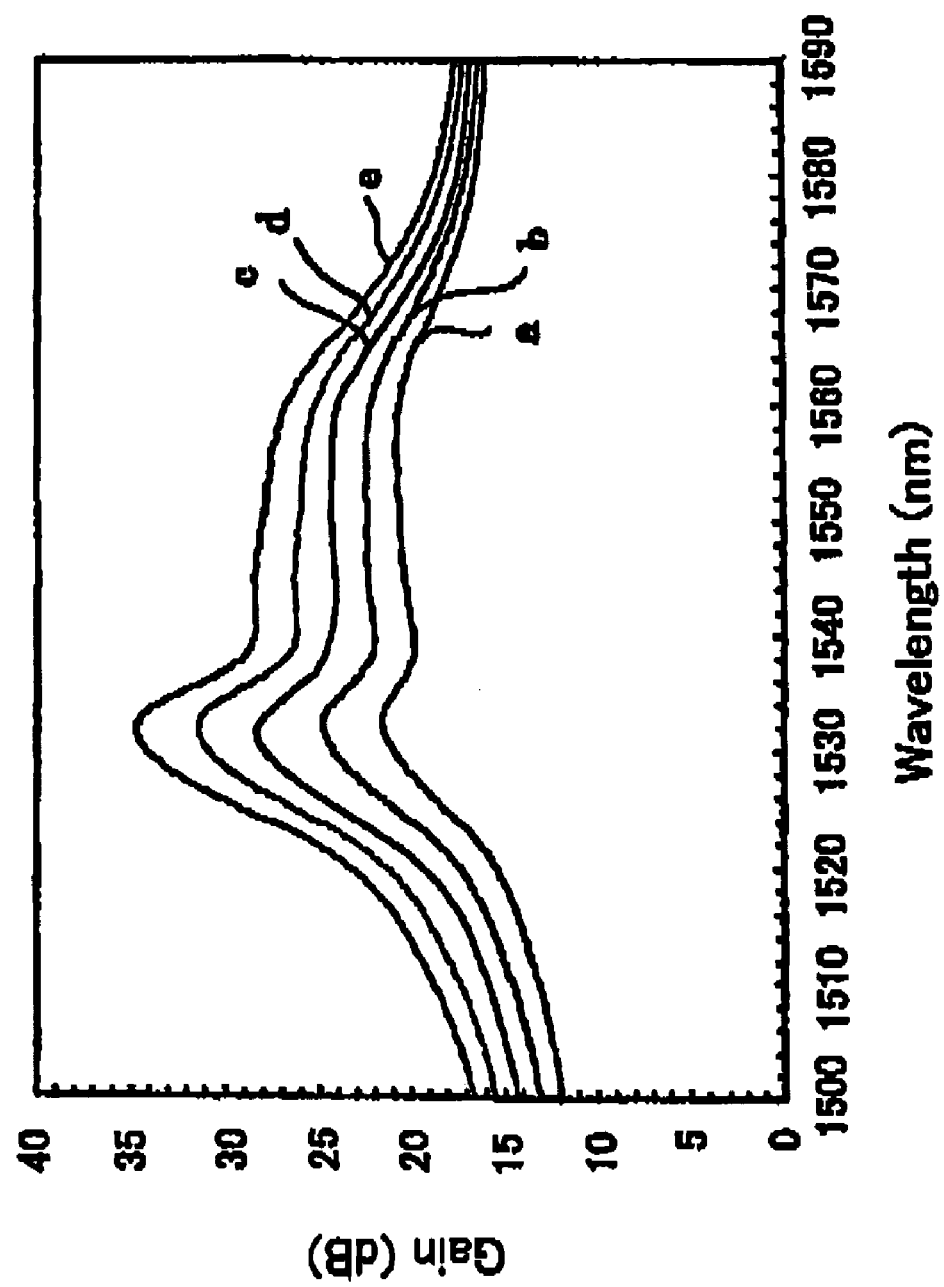
FIG. 5 is a graph showing EDFA gain profiles.

For example, when a dynamic gain equalizer for flattening EDFA gain wavelength-dependence as shown in FIG. 5 is formed with an optical transversal filter as shown in FIG. 6 with N =8, the tap coefficients are given as shown in Table 1.

necting circuits is input to the optical connecting circuit 12 having the above-mentioned substantially center optical delay line 10 (here, 10*d*) 6 the inventors have proposed a dynamic gain equalizer according to the present embodiment of the present invention.

TABLE 1

| Tap Num | Equalizer1' | | Equalizer2' | | Equalizer3' | | Equalizer4' | | Equalizer5' | |
|---|---|---|---|---|---|---|---|---|---|---|
| | an | θ n(rad) | an | θ n(rad) | an | θ n(rad) | an | θ n(rad) | an | θ n(rad) |
| 0 | 0.01761 | 1.33215 | 0.01129 | 1.05839 | 0.00705 | 0.27236 | 0.01037 | −0.68849 | 0.01803 | −1.03396 |
| 1 | 0.03551 | 0.67094 | 0.03661 | 0.36660 | 0.03985 | 0.09787 | 0.04473 | −0.12463 | 0.05078 | −0.30389 |
| 2 | 0.03773 | −0.10743 | 0.05220 | −0.53276 | −0.07055 | −0.74238 | 0.08945 | −0.85638 | 0.10789 | −0.92549 |
| 3 | 0.01420 | 0.43360 | 0.03285 | −1.38257 | 0.06915 | −1.54114 | 0.10436 | −1.56536 | 0.13786 | −1.55901 |
| 4 | 1.00000 | 0.00000 | 1.00000 | 0.00000 | 1.00000 | 0.00000 | 1.00000 | 0.00000 | 1.00000 | 0.00000 |
| 5 | 0.01420 | −0.43360 | 0.03285 | 1.38257 | 0.06915 | 1.54114 | 0.10436 | 1.56536 | 0.13786 | 1.55901 |
| 6 | 0.03773 | 0.10743 | 0.05220 | 0.53276 | 0.07055 | 0.74238 | 0.08945 | 0.85638 | 0.10789 | 0.92549 |
| 7 | 0.03551 | −0.67094 | 0.03661 | −0.36660 | 0.03985 | −0.09787 | 0.04473 | 0.12463 | 0.05078 | 0.30389 | of EDFA pump light level. In addition, the optical amplitude is normalized at the maximum.

As is clear from Table 1, for the conventional optical transversal filter, ratios of optical amplitudes an to respective taps are not uniform. In the conventional optical transversal filter, since this nonuniformity in the optical amplitudes affects insertion loss directly, there occurs large loss.

Then, in the configuration on FIG. 6, the insertion loss is a value calculated from the following Equation 10 based on Equation 2.

$$\left| \frac{1}{N} \sum_{n=0}^{N-1} a_n \right|^2 \quad \text{Equation 10}$$

For this reason, in the optical transversal filter shown in FIG. 6, approximately 94% of optical power is input to the optical connecting circuit having the substantially center optical delay line 10 (optical delay line 10*d* of tap number 4 in FIG. 6) and the remaining about 6% of optical power is input to the optical connecting circuits having the other optical delay lines 10.

Here, as each of the delay lines 10 is connected to a variable optical attenuator 8, optical amplitude is changed by the variable optical attenuator 8 to make the optical power reduced, which then brings about insertion loss in light propagating through the corresponding connecting circuit 12.

Then, insertion losses of the above-mentioned Equalizer 1' through 5' are obtained as shown in Table 2, and the insertion loss of Equalizer 5' is 13.9 dB.

TABLE 2

| | Equalizer1' | Equalizer2' | Equalizer3' | Equalizer4' | Equalizer5' |
|---|---|---|---|---|---|
| Insertion loss (dB) | 16.5 | 16.1 | 15.4 | 14.6 | 13.9 |

After examining the above, the inventors have noted that the tap coefficient $a_n$ of the optical transversal filter is determined in line symmetry with respect to the substantial center of the optical delay line 10. Then, in consideration of the fact that much light to be input to plural optical con- In other words, the inventors prepared an odd number of optical outputting ends 17 of the multistage optical coupler 7 and an odd number of optical inputting ends 18 of the multistage optical coupler 11 and arranged the multistage optical coupler 7 and the multistage optical coupler 11 in such a manner that they are asymmetric with respect to an extension of a line connecting the center arranged position of the optical outputting ends 17 of the multistage optical coupler 7 and the center arranged position of the optical inputting ends 18 of the multistage optical coupler 11, Then, one optical outputting portion of the first stage optical coupler 1 (1*a*) of the aforementioned multistage optical coupler 7 is connected to an inputting side of the substantially center optical delay line 10*e*, and the outputting side of the substantially center optical delay line 10*e* is connected to one optical inputting portion (that is, optical inputting end 1ee) of the final stage optical coupler 3 of the aforementioned multistage optical coupler 11.

By this connection, as light passing through the substantially center optical delay line 10*e* only passes through the substantially center optical delay line 10*e*, the first stage optical coupler 1*a*, the optical phase shifter 9, and the final stage optical coupler 3*a*, the insertion loss becomes substantially zero.

In the present embodiment, approximately 94% of optical power is input to an optical connecting circuit 12 having the substantially center optical delay line 10*e* and the remaining 6% optical power is input to the optical connecting circuits 12 having the other optical delay lines, and the insertion loss of the 6% optical power is substantially zero, thereby achieving insertion loss of zero over the whole optical waveguide circuit 2. Even when approximately 50%, 60%, 70% and 80% of optical power is input to an optical connecting circuit 12 having the substantially center optical delay line 10 and the remaining 50%, 40%, 30% and 20% optical power is input to the optical connecting circuits 12 having the other optical delay lines, the same result as described in the above-mentioned embodiment can be obtained.

As described above, since the insertion loss in the present embodiment is small and any waveform filter is composed in the same way of the conventional optical transversal filter, even if pump light level of light to be input to EDFA varies, it is possible to flatten a EDFA gain profile depending on the variation, thereby realizing a dynamic gain equalizer with small insertion loss.

In addition, a dynamic gain equalizer according to the present embodiment is manufactured in the following way. First, a under clad film of silica glass and a core film of silica glass are formed on a silicon substrate by the flame hydrolytic deposition method.

Then, an optical transversal filter pattern is transcribed on the core film by photo lithography and reactive ion etching method via a photomask on which a circuit on FIG. 1 is drawn, and the circuit of a core (optical waveguide) is formed. After that, an over clad film of silica glass is formed by using the flame hydrolytic deposition method again, thereby to form the dynamic gain equalizer 2.

Further, among the optical couplers 1 which fonts the multistage optical couplers 7 and the optical couplers 3 of the multistage optical coupler 11, variable optical amplitude means 21 and 22 are formed in optical waveguides interposed between directional couplers 4 of Mach-Zehnder interferometers. These variable optical amplitude means 21 and 22 are each formed by forming a Ta heater by the sputtering method and providing a TiNi heater by the sputtering method on the over clad layer.

Furthermore, likewise, the phase shifter 9 is provided with phase regulating means 6 formed by a TiNi heater. Further, in order to supply power to these heaters, TiNi/Au electrodes are formed.

Then, power is supplied from the TiNi/Au electrodes to the heaters for energization to generate heat at the heaters, and the heat is used to generate a thermooptic effect in the optical couplers 1, the optical couplers 3 and phase shifters 9 formed in the silica optical waveguides. This thermooptic effect makes it possible to change optical amplitude of the optical couplers 1 and the optical couplers 3 and phase regulated amounts of the optical phase shifters 9.

In addition, a dynamic gain equalizer to which the present invention is applied is formed with the tap number being 9 and the tap coefficients given in Table 3.

As is clear from these figures, the dynamic gain equalizer according to the present embodiment can be used to flatten a gain at the wavelength of approximately 1.55 μm (wavelengths ranging from 1530 na through 1560 nm). Here, the flattening level (value obtained by subtracting the minimal gain from the maximal gain) is 0.8 dB for the profile e of the most severe condition for gain flattening and 1 dB or less for all the profiles a, b, c, d and e.

Further in the present ebodiment, the insertion loss is approximately 3 dB for the manufactured dynamic gain equalizers (equalizer 1 through 5) of different pump levels. Here, the insertion loss includes actual propagation loss of the circuit, circuit excess loss, and connection loss with optical fibers.

As described up to this point, according to the present embodiment, even if the EDFA pump light level varies, gain flattening is allowed to be performed corresponding to variation of the pump light level, thereby realizing a dynamic gain equalizer having small insertion loss.

Figure 10:
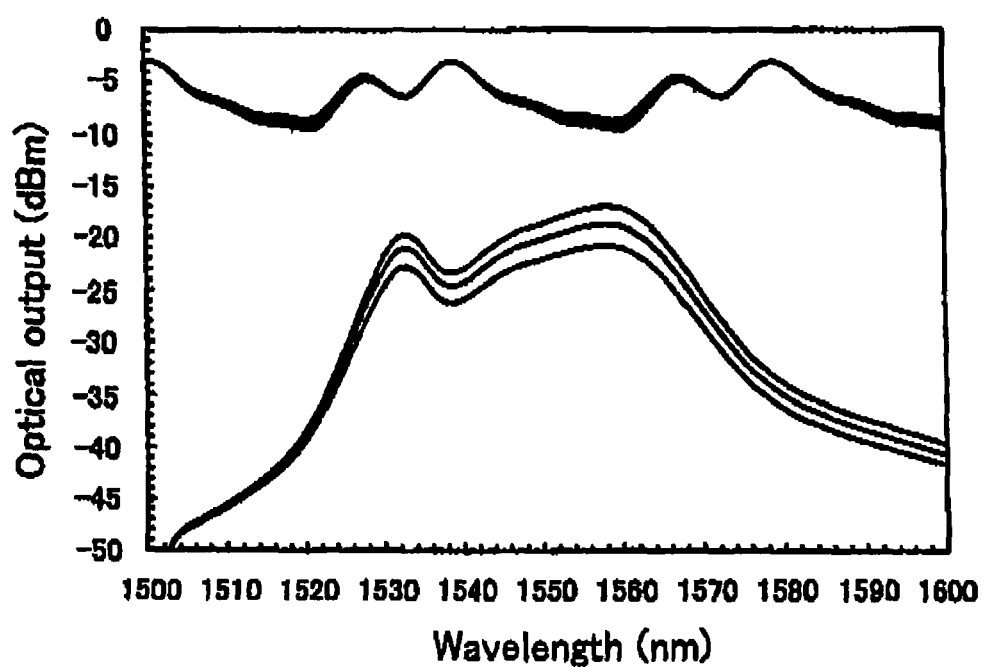
FIG. 10 is a graph showing an example of loss profiles of the embodiment on FIG. 1 and EDFA gain profiles which are to be gain flattening based on the embodiment.
Figure 11:
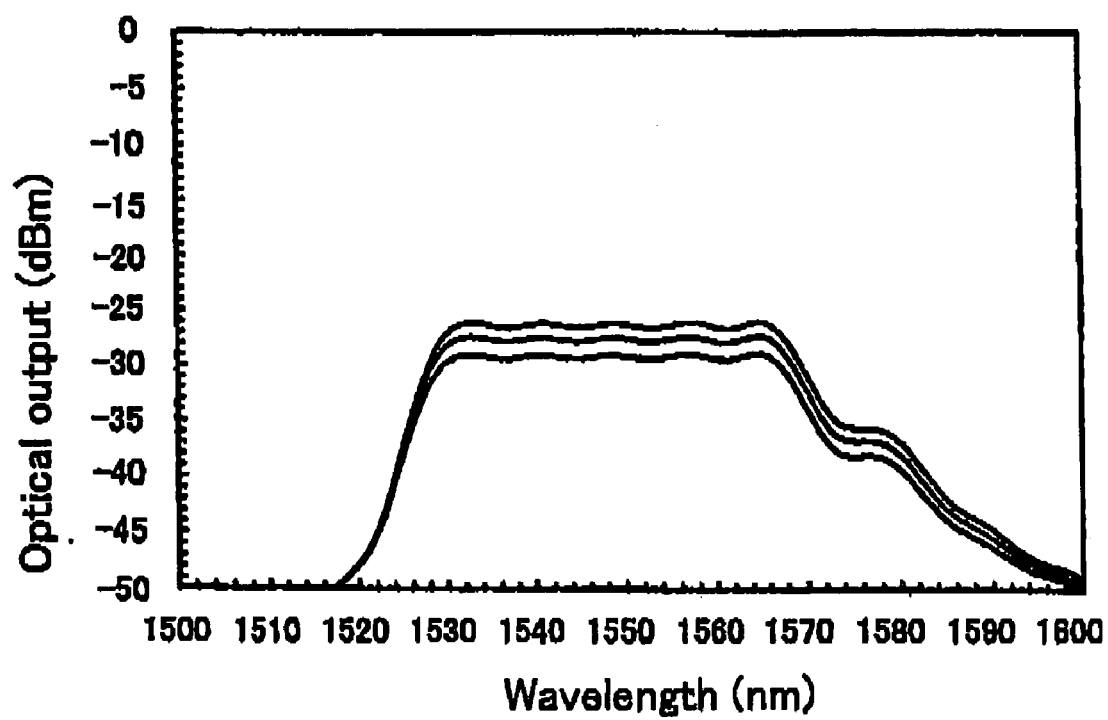
FIG. 11 is a graph showing gain profiles which are subjected to EDFA gain flattening based on the embodiment on FIG. 10.

As an example of the above-described embodiment, the length of optical delay line (dL) is set at 41.1 μm and flattening of an EDFA gain profile shown in FIG. 10 is performed. Designed values of a dynamic gain equalizer are as shown in Table 4 below. Equalizers 1 through 3 shown in Table 4 are arranged in ascending order of the pump light level. Besides, optical amplitude is normalized at the maximum. Insertion losses of manufactured Equalizers 1 through 3 of different pump light levels (see Table 4) are all approximately 3 dB. This insertion loss includes actual propagation loss of the circuit, circuit excess loss, and connection loss with optical fibers. Filter profiles of the Equalizers 1 through 3 and their results of gain flattening are shown in FIG. 11. The gain deviation of each of the Equalizers 1 through 3 can be fall within plus or minus 0.3 dB in.

TABLE 3

| Tap Num | Equalizer1' | | Equalizer2' | | Equalizer3' | | Equalizer4' | | Equalizer5' | |
|---|---|---|---|---|---|---|---|---|---|---|
| | an | θ n(rad) | an | θ n(rad) | an | θ n(rad) | an | θ n(rad) | an | θ n(rad) |
| 0 | 0.01421 | 1.27863 | 0.00743 | 0.91088 | 0.00531 | −0.43191 | 0.00389 | −0.36954 | 0.01037 | −1.08972 |
| 1 | 0.02793 | 0.47623 | 0.02989 | 0.07686 | 0.03499 | −0.23040 | 0.03240 | 0.75126 | 0.02922 | 0.53820 |
| 2 | 0.02851 | −0.42597 | 0.04629 | −0.86236 | 0.06651 | −1.02859 | 0.07920 | −0.43555 | 0.09247 | −0.55948 |
| 3 | 0.00413 | 1.56384 | 0.03415 | −1.85125 | 0.07034 | −1.80025 | 0.10600 | −1.48674 | 0.14070 | −1.50737 |
| 4 | 1.00000 | 0.00000 | 1.00000 | 0.00000 | 1.00000 | 0.00000 | 1.00000 | 0.00000 | 1.00000 | 0.00000 |
| 5 | 0.00413 | −1.56384 | 0.03415 | 1.85125 | 0.07034 | 1.80025 | 0.10600 | 1.48674 | 0.14070 | 1.50737 |
| 6 | 0.02851 | 0.42697 | 0.04629 | 0.86236 | 0.06651 | 1.02859 | 0.07920 | 0.43555 | 0.09247 | 0.65948 |
| 7 | 0.02793 | −0.47623 | 0.02989 | −0.07686 | 0.03499 | 0.23040 | 0.03240 | −0.75126 | 0.02922 | −0.53820 |
| 8 | 0.01421 | −1.27863 | 0.007428 | −0.91088 | 0.005306 | 0.431906 | 0.003886 | 0.369543 | 0.010372 | 1.08972 |

Here, Equalizers 1 though 5 are arranged in ascending order of FDFA pump light level. Optical amplitude is normalized at the maximum.

Figure 3:
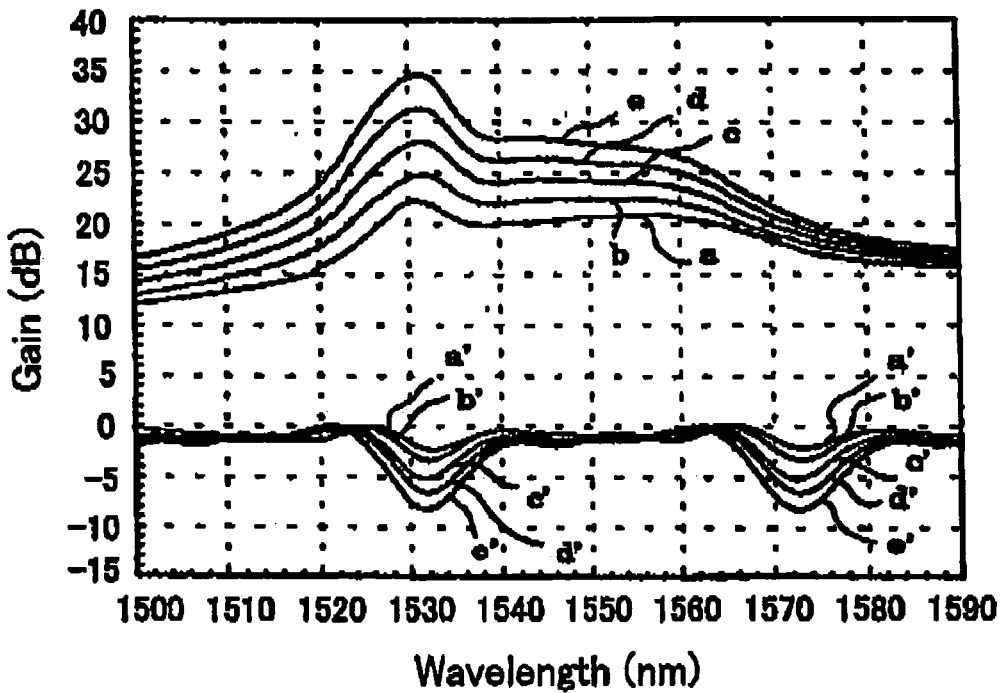
FIG. 3 is a graph for showing loss profiles of the above-mentioned embodiment and EDFA gain profiles which are to be subjected to gain flattening based on the above-mentioned embodiment.

The profile lines a through e on FIG. 3 present EDFA gain profiles aligned in ascending order of EDFA pump light level, and profile lines a', b', c', d' and e' present insertion lose profiles of experimentally manufactured Equalizers 1, 2, 3, 4 and 5 based on a dynamic gain equalizer according to this embodiment. The experimentally manufactured Equalizers 1 through 5 have respective tap coefficients shown in Table 3.

Figure 4:
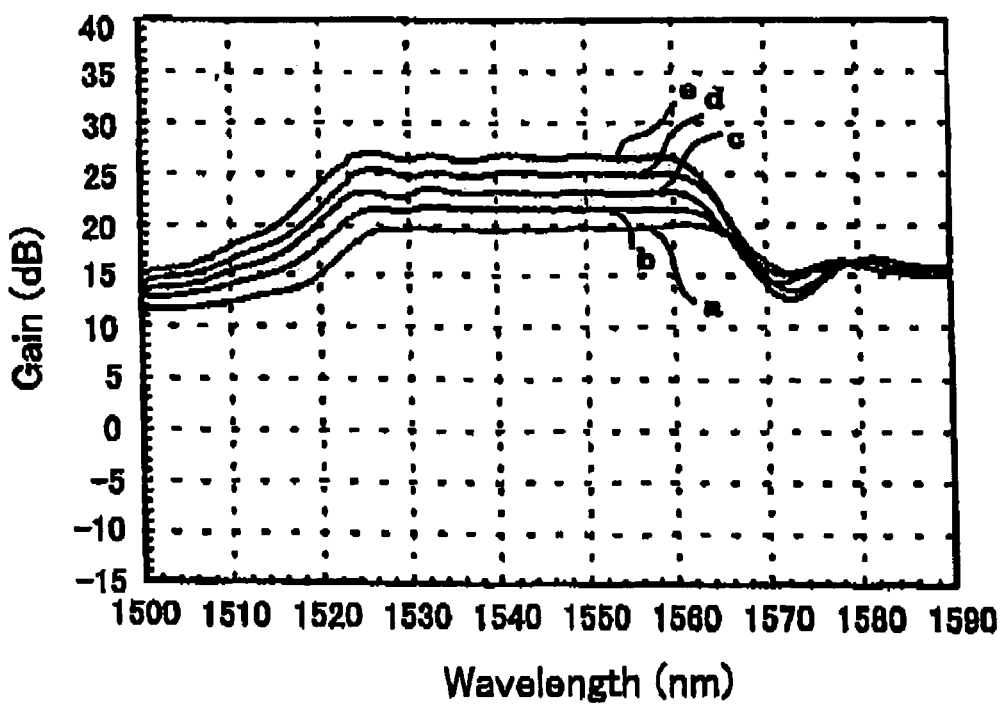
FIG. 4 is a graph for showing gain profiles which are subjected to EDFA flattening based on the above-mentioned embodiment.

In addition, FIG. 4 shows results of gain flattening of EDFAs having gain profiles of profile lines a through e on FIG. 3 by using a dynamic gain equalizer according to the present embodiment.

TABLE 4

| Tap Num | Equalizer1' | | Equalizer2' | | Equalizer3' | |
|---|---|---|---|---|---|---|
| | an | θ n(rad) | an | θ n(rad) | an | θ n(rad) |
| 0 | 0.0328 | −0.2151 | 0.0309 | −0.2777 | 0.0342 | −0.1370 |
| 1 | 0.0578 | −0.9165 | 0.0559 | −0.9384 | 0.0581 | −0.8892 |
| 2 | 0.0297 | −1.7495 | 0.0307 | −1.6916 | 0.0273 | −1.8372 |
| 3 | 0.1307 | 1.3225 | 0.1175 | 1.3026 | 0.1447 | 1.3434 |
| 4 | 1.0000 | 0.0000 | 1.0000 | 0.0000 | 1.0000 | 0.0000 |
| 5 | 0.1307 | −1.3225 | 0.1175 | −1.3026 | 0.1447 | −1.3434 |
| 6 | 0.0297 | 1.7495 | 0.0307 | 1.6916 | 0.0273 | 1.8372 |
| 7 | 0.0578 | 0.9165 | 0.0559 | 0.9384 | 0.0581 | 0.8892 |
| 8 | 0.0328 | 0.2151 | 0.0309 | 0.2777 | 0.0342 | 0.1370 |

Here, the present invention is not limited to the aforementioned embodiment and various modified embodiments are possible. For example, the number of taps in a dynamic gain equalizer is not limited to the above and can be set appropriately. For example, the number of taps in the example of a dynamic gain equalizer on FIG. 7 is five.

Figure 7:
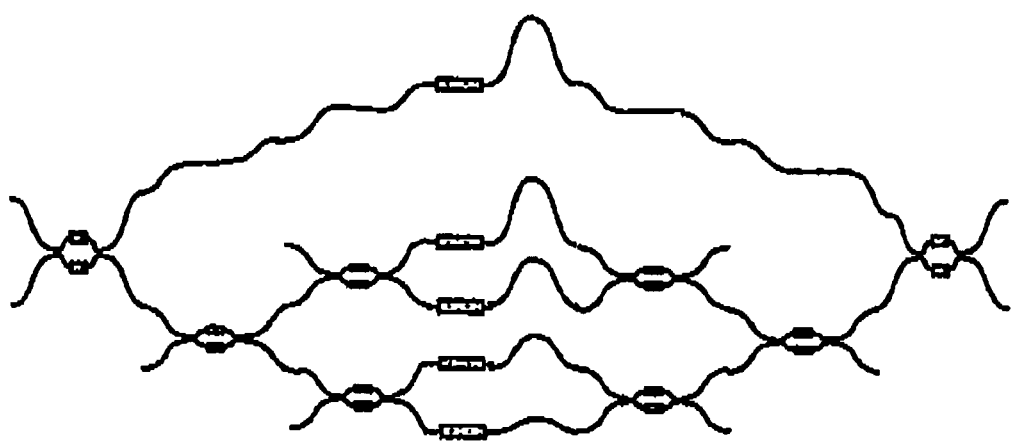
FIG. 7 is a view illustrating a configuration of substantial parts of a dynamic gain equalizer according to another embodiment of the present invention.

The dynamic gain equalizer shown in FIG. 7 is configured to have less taps than that in FIG. 1 without reducing resolution of the optical transversal filter. As is clear from FIG. 1 and Table 1, in consideration of the point that coefficients of the optical transversal filter are in line symmetry with respect to the substantial center of the delay line, if tap coefficient of one side are used to indicate tap coefficients of the other side, the number of taps can be reduced. This way is described below. In Table 1, a tap coefficient a[n] of the Tap Num=1 through 3 is the same as that of Tap Num 5 through 7. Then, if two times of the tap coefficient a[n] of the Tap Num=0 through 3 is used, it is possible to do away with taps of Tap Num 5 through 7 without reducing resolution of the optical transversal filter. The tap coefficients of this case are shown in Table 5 below. Use of such a configuration reduces the number of taps used, thereby making it possible to further reduce insertion loss and downsizing the circuit.

length. In the optical delay lines 10 delay differences are given based on the respective straight line portions. Here, phase regulating means 6 is mounted on each of the straight lines 52. FIG. 9 shows a modification of FIG. 9A, in which the straight line portions 52 (see FIG. 8) are not provided and only the R portions 50 are configured. The radii of the optical delay lines 10 from the center portion 54 are different, the optical delay lines 10 are different by the different radii, and these differences in length cause delay differences. FIG. 9C shows a combination of the configuration on FIG. 9A and the configuration on FIG. 9B. In other words, an optical delay line 10 can be configured of an R portion 50 and a straight line 52 or of an R portion 50 only. This is appropriately selected based on a delay a mount to be added. Although FIGS. 9A, 9B and 9C show the configurations having 5 taps, the optical delay lines 10 on FIGS. 9A, 9B and 9C can be applied to the light guide circuit 2 on FIG. 1 of which the number of taps is 9. By applying the configurations on FIGS. 9A, 9B and 9C, it is possible to reduce the circuitry size in the longitudinal direction.

Furthermore, in the present invention, the order of connection of an optical phase shifter 9 and an optical delay line 10 is not confined within any specific limits however can be

TABLE 5

| Tap Num | Equalizer1 | | Equalizer2 | | Equalizer3 | | Equalizer4 | | Equalizer5 | |
|---|---|---|---|---|---|---|---|---|---|---|
| | a[n] | θ [n](rad) | a[n] | θ [n](rad) | a[n] | θ [n](rad) | a[n] | θ [n](rad) | a[n] | θ [n](rad) |
| 0 | 1.00000 | 0.00000 | 1.00000 | 0.00000 | 1.00000 | 0.00000 | 1.00000 | 0.00000 | 1.00000 | 0.00000 |
| 1 | 0.02841 | 0.86720 | 0.06570 | −2.76514 | 0.13829 | −3.08228 | 0.20872 | −3.13071 | 0.27571 | −3.11803 |
| 2 | 0.07546 | −0.21485 | 0.10440 | −1.06551 | 0.14109 | −1.48476 | 0.17890 | −1.71276 | 0.21578 | −1.85098 |
| 3 | 0.07102 | 1.34188 | 0.07321 | 0.73319 | 0.07969 | 0.19573 | 0.08945 | −0.24926 | 0.10157 | −0.60779 |
| 4 | 0.03522 | 1.33215 | 0.02257 | 1.05839 | 0.01411 | 0.27236 | 0.02073 | −0.68849 | 0.03607 | −1.03396 |

Figure 8:
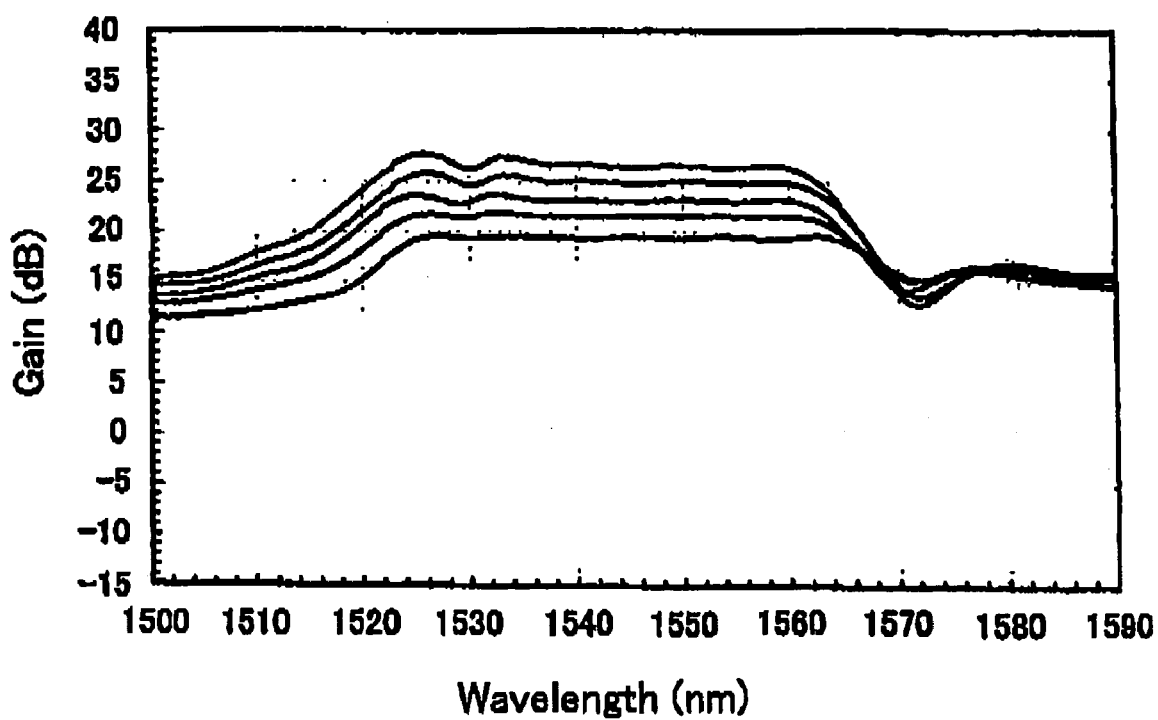
FIG. 8 is a graph showing gain profiles which are subjected to EDFA gain flattening based on the embodiment on FIG. 7.
Figure 9A:
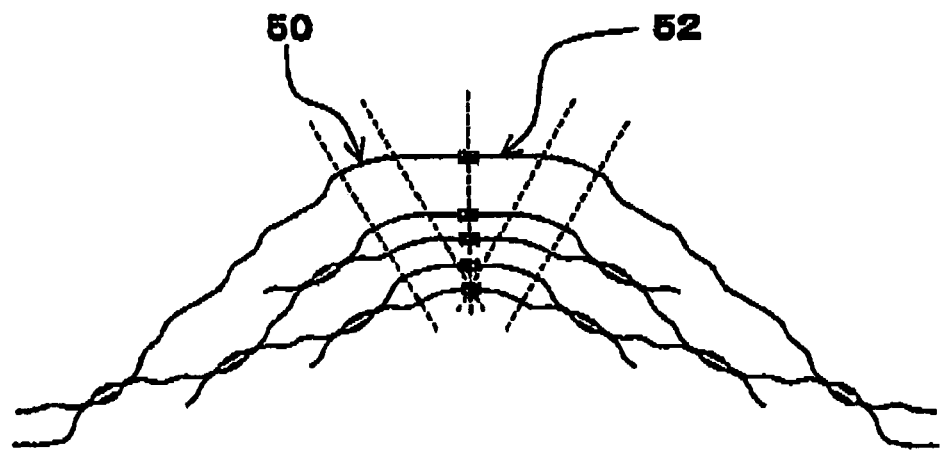
FIG. 9A is a view illustrating a configuration of substantial parts of a dynamic gain equalizer according to yet another embodiment of the present invention.
Figure 9B:
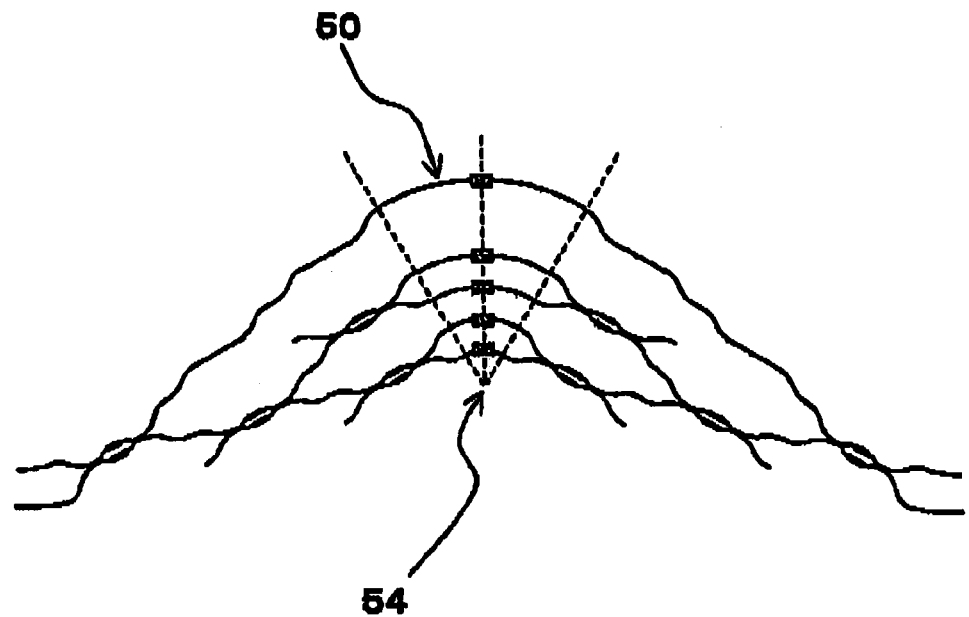
FIG. 9B is a view illustrating a configuration of substantial parts of a dynamic gain equalizer according to yet another embodiment of the present invention.
Figure 9C:
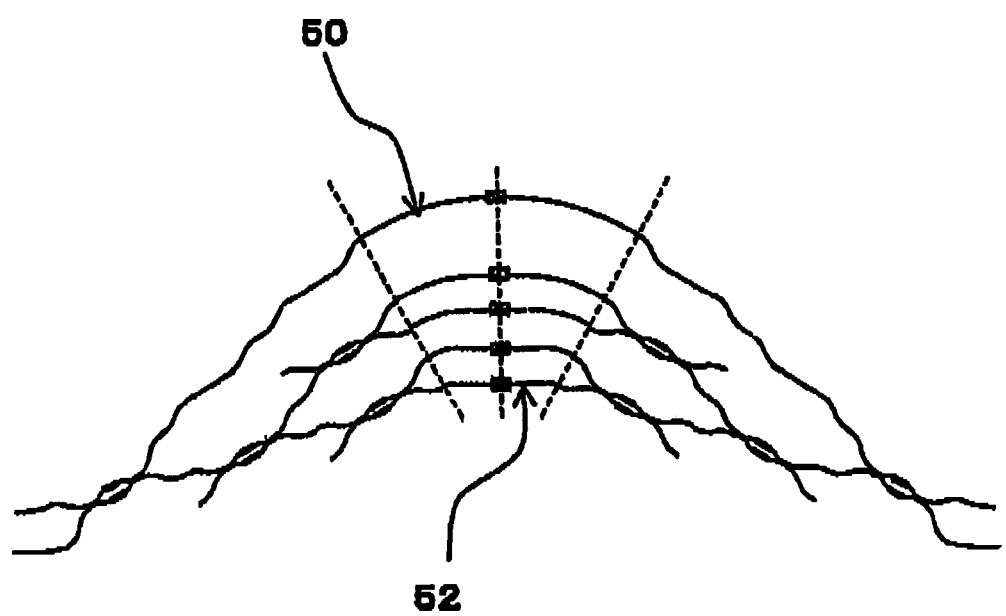
FIG. 9C is a view illustrating a configuration of substantial parts of a dynamic gain equalizer according to yet another embodiment of the present invention.

Next description is made with reference to FIG. 8 about an example of an EDFA gain profile flattened by dynamic gain equalizer of FIG. 7.

FIG. 8 shows results of flattening an EBFS profile by a dynamic gain equalizer which has a configuration of FIG. 7 and characteristics shown in the following Table 6. The flattening level (a value obtained by subtracting the minimal gain from the maximal gain) is 1.3 dB for the profile e of the most severe condition for gain flattening and 1.5 dB or less for all the profiles a, b, c, d and e.

set appropriately. It is possible to provide another circuit between the optical phase shifter 9 and the optical delay line 10.

Furthermore, a dynamic gain equalizer according to the above-described embodiments performs flattening of gain in the wavelength of approximately 1.55 μm in which the EDFA gain is relatively large. However, since the dynamic gain equalizer of the present invention can be configured to have various loss profiles, it is possible to flatten gain in

TABLE 6

| Tap Num | Equalizer1 | | Equalizer2 | | Equalizer3 | | Equalizer4 | | Equalizer5 | |
|---|---|---|---|---|---|---|---|---|---|---|
| | a[n] | θ [n](rad) | a[n] | θ [n](rad) | a[n] | θ [n](rad) | a[n] | θ [n](rad) | a[n] | θ [n](rad) |
| 0 | 1.0000 | 0.0000 | 1.0000 | 0.0000 | 1.0000 | 0.0000 | 1.0000 | 0.0000 | 1.0000 | 0.0000 |
| 1 | 0.0083 | 1.5638 | 0.0683 | −1.8513 | 0.1407 | −1.8002 | 0.2120 | −1.4867 | 0.2814 | −1.5074 |
| 2 | 0.0570 | −0.4270 | 0.0926 | −0.8624 | 0.1330 | −1.0286 | 0.1584 | −0.4355 | 0.1849 | −0.5595 |
| 3 | 0.0559 | 0.4762 | 0.0598 | 0.0769 | 0.0700 | −0.2304 | 0.0648 | 0.7513 | 0.0584 | 0.5382 |
| 4 | 0.0284 | 1.2786 | 0.0149 | 0.9109 | 0.0106 | −0.4319 | 0.0078 | −0.3695 | 0.0207 | −1.0897 |

Further, modifications of FIG. 7 are shown in FIGS. 9A, 9B and 9C. Main configurations different from that on FIG. 7 are that optical couplers 1 and optical couplers 3 are folded with respect to the optical delay lines 10 as a center. In the optical transversal filter circuit shown in FIG. 9A, an R portion 50 of each of the optical delay lines 10 is designed to be constant and straight line portions 52 are different in wavelengths other than 1.55 μm and further to flatten a gain profile of another optical amplifier other than an EDFA.

Furthermore, in the above-described embodiments, the optical couplers 1 (1a, 1c, 1d) and the optical couplers 3 (3a, 3c, 3d) may be configured to have the same characteristic. Since each of these optical couplers 1 and optical couplers 3 can be configured to have any demultiplexing and multiplexing characteristics, it is possible to have such an initial characteristic as to obtain desired tap coefficients (initial characteristic here means a characteristic when the operation for variation (operation for adjustment) is not performed), thereby obtaining desired tap coefficients with small power consumption only by slightly performing the operation for variation. However, any process error in flame hydrolytic deposition method, photo lithography and reactive ion etching method causes deviations in designed values of initial characteristics of the optical couplers 1 and the optical couplers 3. If the optical couplers 1 and the optical couplers 3 are designed to have any demultiplexing and multiplexing characteristics, as the deviations are different in magnitude depending on the respective couplers, it is necessary to measure deviations of all the couplers in order to obtain desired demultiplexing and multiplexing characteristics in taps.

Then, if all of the optical couplers 1 and the optical couplers 3 are configured based on the same designed values so as to have the same initial characteristics, the same deviation may occur in all the couplers. Then, if a deviation of any one of the couplers is measured, the demultiplexing and multiplexing characteristics of the whole circuit are allowed to be grasped effectively, thereby facilitating obtainment of desired demultiplexing and multiplexing characteristics in taps.

According to the above-described embodiments, since the multistage optical coupler and the multistage optical coupler are configured to be in asymmetry with respect to an extension of a line connecting the center arranged position of optical outputting ends of the multistage optical coupler and the center arranged position of optical inputting ends of the multistage optical coupler, it is possible to optimize an optical power ratio of light propagating through optical connecting circuits which includes optical phase shifters and optical delay lines provided between these multistage couplers, thereby realizing a dynamic gain equalizer which has small insertion loss and is allowed to flatten an EDFA gain profile in accordance with a pump light level of light to be input to an EDFA.

Further, according to the present invention, the number of the optical outputting ends of the multistage optical coupler and the number of the optical inputting ends of the multistage optical coupler are the same odd number, one optical outputting portion of the first stage optical coupler of the multistage optical coupler and one inputting portion of the final stage optical coupler of the multistage optical coupler are both connected to the substantially center optical delay line which has a middle length among the optical delay lines. The optical delay lines other than the substantially center optical delay line are provided between an optical demultiplexing portions and an optical multiplexing portion. With this configuration, it is easy to configure a dynamic gain equalizer which is sure to exert the above-described effect.

Furthermore, according to the present invention, at least one of the plural optical couplers and the plural optical couplers has a Y-shaped demultiplexing circuit or at least one of the plural optical couplers and the plural optical couplers has a Mach-Zehnder interferometer. In this configuration, provision of these circuits makes it possible to configure a multistage optical coupler and a multistage optical coupler readily.

INDUSTRIAL APPLICABILITY

According to the present invention, even if a pump light level of light to be input to an EDFA is changed, it is possible to flatten a gain profile of the EDFA in accordance with the change and to realize a dynamic gain equalizer with reduced insertion loss.

The invention claimed is:

1. A dynamic gain equalizer comprising:
an optical waveguide circuit having a multistage optical demultiplexing coupler which is formed by connecting optical demultiplexing couplers arranged at a plurality of stages,
a multistage optical multiplexing coupler formed by connecting optical multiplexing couplers arranged at a plurality of stages, and
optical connecting circuits including optical phase shifters each capable of changing a phase of propagating light and optical delay lines each for adding a predetermined delay time to the propagating light,
wherein each of at least one of the optical demultiplexing couplers in the multistage optical demultiplexing coupler and at least one of the optical multiplexing couplers in the multistage optical multiplexing coupler is provided with variable optical amplitude means, and the multistage optical demultiplexing coupler and the multistage optical multiplexing coupler are formed asymmetrically with respect to an extension of a line which connects a center arranged position of optical outputting ends of the multistage optical demultiplexing coupler with a center arranged position of optical inputting ends of the multistage optical multiplexing coupler.

2. The dynamic gain equalizer as claimed in claim 1, wherein the optical delay lines are different in length from each other, an optical inputting side of a substantially center optical delay line out of the optical delay lines is directly connected to one optical outputting portion of a first stage optical demultiplexing coupler of the multistage optical demultiplexing coupler, and an outputting side of the substantially center optical delay line is connected to one optical inputting portion of a final stage optical multiplexing coupler of the multistage optical multiplexing coupler.

3. The dynamic gain equalizer as claimed in claim 2, wherein the optical outputting ends of the multistage optical demultiplexing coupler and the optical inputting ends of the multistage optical multiplexing coupler comprise an odd number of optical outputting ends and a same odd number of optical inputting ends as that of the optical outputting ends, respectively, and further comprising:
an opposite optical outputting portion of the first stage optical demultiplexing coupler is connected to an optical inputting portion of a second stage optical demultiplexing coupler, the second stage optical demultiplexing coupler and optical demultiplexing couplers following the second stage optical demultiplexing coupler form an optical demultiplexing portion, each of optical outputting ends of the optical demultiplexing portion is connected to an optical inputting side of a corresponding optical delay line other than the substantially center optical delay line,
an opposite optical inputting portion of the final stage optical demultiplexing coupler is connected to an optical demultiplexing coupler immediately in front of the final stage optical coupler, optical multiplexing couplers in front of the final stage optical multiplexing coupler form an optical multiplexing portion, and each of optical inputting ends of the optical multiplexing portion is connected to an optical outputting side of a corresponding optical delay line other than the substantially center optical delay line.

4. The dynamic gain equalizer as claimed in claim 3, wherein the optical demultiplexing portion and the optical multiplexing portion are formed symmetrically with respect to an extension of a line which connects a center arranged position of the optical outputting ends of the optical demultiplexing portion with a center arranged position of the optical inputting ends of the optical multiplexing portion.

5. The dynamic gain equalizer as claimed in claim 4, wherein at least approximately 50% of optical power is input into an optical connecting circuit including the substantially center optical delay line and remaining optical power is input to an optical connecting circuit having optical delay lines other than the substantially center optical delay line.

6. The dynamic gain equalizer as claimed in claim 1 or 2, wherein at least one of the optical demultiplexing couplers and the optical multiplexing couplers has a Y-shaped circuit.

7. The dynamic gain equalizer as claimed in claim 1 or 2, wherein at least one of the optical demultiplexing couplers and the optical multiplexing couplers has a Mach-Zehnder interferometer.

8. The dynamic gain equalizer as claimed in claim 1 or 2, wherein the optical delay lines of the optical waveguide circuit are set to be sequentially longer by DL, starting from a reference optical delay line, in such a manner that one optical delay line of the optical delay lines is longer than the reference optical delay line by dL and another optical delay line of the optical delay lines is longer than the one optical delay line by dL.

9. The dynamic gain equalizer as claimed in claim 8, comprising a planar lightwave circuit which is the optical waveguide circuit formed on a substrate.

10. The dynamic gain equalizer as claimed in claim 1 or 2, wherein a substantially center optical delay line is half as long as a longest optical delay line with reference to a length of a reference optical delay line.

11. The dynamic gain equalizer as claimed in claim 10 wherein the optical waveguide circuit includes, between the reference optical delay line and the substantially center optical delay line, other optical delay lines.

12. The dynamic gain equalizer as claimed in claim 1 or 2, wherein a substantially center optical delay line is a longest optical delay line with reference to a length of a reference optical delay line.

13. The dynamic gain equalizer as claimed in claim 1, wherein the variable optical amplitude means comprises a TiNi heater, makes optical amplitudes of the optical demultiplexing couplers and the optical multiplexing couplers vary and makes a phase regulated amount of each of the phase shifters vary.

14. The dynamic gain equalizer as claimed in claim 1 or 2, wherein tap coefficients are in line symmetry with respect to a substantial center of the optical delay lines and predetermined tap coefficients of one side are used to indicate tap coefficients of an opposite side so as to reduce branches of the multistage optical demultiplexing coupler.

15. The dynamic gain equalizer as claimed in claim 1 or 2, wherein the optical multiplexing couplers and the optical demultiplexing couplers have almost same multiplexing and demultiplexing characteristics.

16. The dynamic gain equalizer as claimed in claim 1 or 2, wherein the multistage optical multiplexing coupler and the multistage optical demultiplexing coupler are curved to be symmetrical with respect to the optical delay lines, each of curved tops includes an R portion and a straight line portion, the R portion is fixed in length and the straight line portion is different in length between the curved tops, and a delay difference is added by the length of the straight line portion.

17. The dynamic gain equalizer as claimed in claim 1 or 2, wherein the multistage optical demultiplexing coupler and the multistage optical multiplexing coupler are curved to be symmetrical with respect to the optical delay lines, each of curved tops includes an R portion, and a delay difference is added by a difference in length between the optical delay lines based on a radius difference of the R portion.

18. The dynamic gain equalizer as claimed in claim 1 or 2, wherein the multistage optical demultiplexing coupler and the multistage optical multiplexing coupler are curved to be symmetrical with respect to the optical delay lines, each of curved tops includes an R portion or an R portion and a straight line portion, and a delay difference is added by a difference in length between the optical delay lines based on a radius difference of the R portion and a difference in length of the straight line portion.

* * * * *